US008677376B2

(12) United States Patent
Kwan et al.

(10) Patent No.: US 8,677,376 B2
(45) Date of Patent: *Mar. 18, 2014

(54) EXPRESSING EQUIVALENCY RELATIONSHIPS WITH IDENTITY GRAPHS ACROSS MULTIPLE ENVIRONMENTS TO CREATE CHANGE LIST TO BE TRAVERSED TO CONFORM THE ENVIRONMENTS

(75) Inventors: Billy Kwan, Bellevue, WA (US); Joseph M. Schulman, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 597 days.

This patent is subject to a terminal disclaimer.

(21) Appl. No.: 12/892,930

(22) Filed: Sep. 29, 2010

(65) Prior Publication Data

US 2012/0079454 A1    Mar. 29, 2012

(51) Int. Cl.
*G06F 9/46* (2006.01)
*G06F 7/00* (2006.01)
*G06F 17/00* (2006.01)
*G06F 17/30* (2006.01)

(52) U.S. Cl.
USPC ........... 718/106; 718/101; 718/102; 707/610; 707/618; 707/620; 707/625; 707/E17.005

(58) Field of Classification Search
None
See application file for complete search history.

(56) References Cited

U.S. PATENT DOCUMENTS

| | | | |
|---|---|---|---|
| 7,181,472 | B2 | 2/2007 | Cameron et al. |
| 7,290,049 | B2 | 10/2007 | Menzies et al. |
| 7,702,747 | B1 | 4/2010 | Liu et al. |
| 2007/0046282 | A1* | 3/2007 | Childress et al. .......... 324/158.1 |

OTHER PUBLICATIONS

Oracle Enterprise Manager Concepts 10g Release 5 (10.2.0.5), Mar. 2009.*
"Microsoft Identity Lifecycle Manager "2" Policy Service: A Look Behind the Curtain", Retrieved at << blogs.msdn.com/b/markgabarra/archive/2008/07/06/microsoft-identity-lifecycle-manager-2-policy-service-a-look-behind-the-curtain.aspx >>, Jul. 6, 2008, pp. 2.
"Identity Synchronization for Windows", Retrieved at << www.actionidentity.com/identity-synchronization-for- windows >>, Retrieved Date: Jul. 28, 2010, pp. 2.
Vilcinskas, et al., "Understanding Microsoft Forefront Identity Manager 2010", Retrieved at << webcache.googleusercontent.com/search?q=cache:zO6S1mNFFNkJ:download.microsoft.com/download/3/2/A/32A7B77A-7D3A-4D24-ACE7-5AA3A908B95E/Understanding%2520FIM%25202010.docx+Understanding+Microsoft+Forefront+Identity+Manager+2010&cd=3&hl=en&ct=clnk&gl=u >>, Oct. 2009, pp. 14.
Janka, János., "Synchronization between heterogeneous data sources", Retrieved at << social.microsoft.com/Forums/en-US/synctechnicaldiscussion/thread/2ea01ae2-fa4e-42e4-a1bd-a9c5327e4f73 >>, May 18, 2009, pp. 2.

* cited by examiner

*Primary Examiner* — Meng An
*Assistant Examiner* — Bing Zhao
(74) *Attorney, Agent, or Firm* — Ben Tabor; Kate Drakos; Micky Minhas

(57) ABSTRACT

A synchronization system is described herein that synchronizes two environments by correctly matching identity objects in a source environment with related objects in a target environment. In addition to matching identities based on primitive attributes, the system matches identities across multiple heterogeneous environments based on their relative positions in an identity graph. The system builds the identity graph by first matching some identity objects based on primitive attribute value comparisons. The system fills in the remainder of the identity graph by comparing references to/from the matched identity objects. The combination of attribute value comparisons and comparing references enables identity-aware applications to complete a single identity graph, determine the equivalency of identities in this graph, and apply policy based on this new relationship.

19 Claims, 5 Drawing Sheets

EXPRESSING EQUIVALENCY RELATIONSHIPS WITH IDENTITY GRAPHS ACROSS MULTIPLE ENVIRONMENTS TO CREATE CHANGE LIST TO BE TRAVERSED TO CONFORM THE ENVIRONMENTS

BACKGROUND

Many organizations depend on large software environments for managing internal and external business data. For example, most corporations have a large databases and related applications for performing human resources functions, accounting, customer management, and so forth. These large environments often include many physical components, such as servers, as well as many software components, such as databases, client applications, backup and other administrative components, and so forth. Deployment and maintenance of large software environments consume a significant amount of time and effort spent by organizational information technology (IT) departments. One example of a large software environment is MICROSOFT™ Forefront Identity Manager (FIM) 2010 (and MICROSOFT™ Identity Lifecycle Manager (ILM) 2007 that preceded it). FIM provides an integrated and comprehensive solution for managing the entire lifecycle of user identities and their associated credentials in an organization, including identity synchronization, certificate and password management, and user provisioning in a single solution that works across heterogeneous environments that allows IT departments to define and automate the processes used to manage identities from creation to retirement.

One popular technique for handling changes to a large software environment is to deploy a test, or pilot, environment that closely mirrors a production environment. IT personnel can work safely within the pilot environment to try various modifications to the environment without the fear of affecting day-to-day business activities. The IT personnel can test configuration changes, add or remove servers, try additional software within the environment, and so forth in a relatively safe environment.

The problem is that once it is time to deploy the changes made in the pilot environment to production, it is often difficult to reconcile the significant differences that may have resulted from the divergence of the two environments during testing. Identity-aware applications apply policy to identities. These applications today match policy to identities by simple value comparisons on primitive attributes (e.g., matching a display name). When comparing identities among heterogeneous systems two semantically identical identities often have different primitive attribute values. Identity-aware business applications incorrectly assume the two identities are different and apply the incorrect or different policies. Organizations using heterogeneous systems prefer that the same policy be applied to all instances of an identity.

SUMMARY

A synchronization system is described herein that synchronizes two environments by correctly matching identity objects in a source environment with related objects in a target environment. In addition to matching identities based on primitive attributes, the system matches identities across multiple heterogeneous environments based on their relative positions in an identity graph. The system builds the identity graph by first matching some identity objects based on primitive attribute value comparisons. The system fills in the remainder of the identity graph by comparing references to/from the matched identity objects. The combination of attribute value comparisons and comparing references enables identity-aware applications to complete a single identity graph, determine the equivalency of identities in this graph, and apply policy based on this new relationship. Thus, the system identifies relationships between objects in two environments that would not be found today, and more effectively synchronizes the objects in the two environments.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
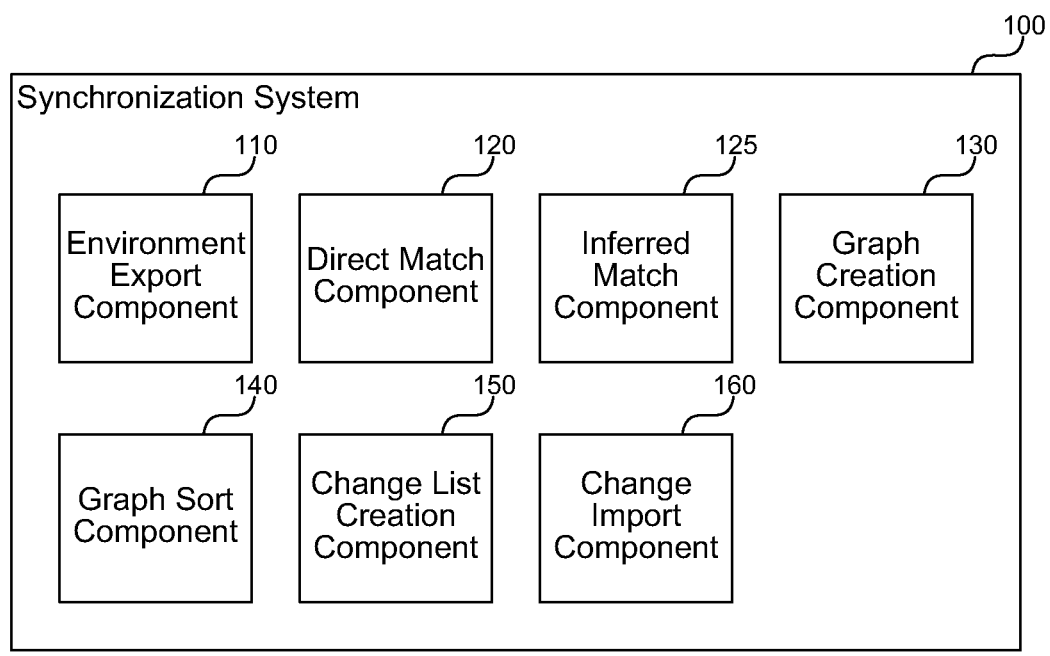
FIG. 1 is a block diagram that illustrates components of the synchronization system, in one embodiment.

A synchronization system is described herein that synchronizes two environments by correctly matching identity objects in a source environment with related objects in a target environment. For example, an administrator may create a pilot environment for testing that uses test user names to create a policy but that should apply to real users in a production environment upon synchronization. In addition to matching identities based on primitive attributes (e.g., display name, email, and so on), the system matches identities across multiple heterogeneous environments based on their relative positions in an identity graph. For example, if two objects can be determined to have the same identity in both environments, then parent objects of those objects may be implied to be related. The system builds the identity graph by first matching some identity objects based on primitive attribute value comparisons. The system fills in the remainder of the identity graph by comparing references to/from the matched identity objects. The combination of attribute value comparisons and comparing references enables identity-aware applications to complete a single identity graph, determine the equivalency of identities in this graph, and apply policy based on this new relationship. Thus, the system identifies relationships between objects in two environments that would not be found today, and more effectively synchronizes the objects in the two environments.

Given two heterogeneous environments, a source environment and target environment, a common task is to synchronize the authoritative information from the source environment to the target environment. The synchronization system attempts to order the synchronization based on references available to ensure that the system creates and updates dependent resources before their parent resources. Resources in both environments contain references to other resources in their respective environments. A reference is any data that can be used to unambiguously associate one resource with another in the same environment.

The synchronization system first joins the resources between source and target environments. Those of ordinary skill in the art will recognize numerous common methods for joining resources. These "joined resources" may have the following three states: i) resource is present in both environments, ii) resource is present in the source environment only, and iii) resource is present in the target environment only. A state of resources present in both environments implies that the synchronization system will modify the target resource to bring it in line with the authoritative attributes from the source resource. For example, when synchronizing from a pilot to a production environment, changed information in the pilot environment may overwrite information in the production environment. A state of a resource from the source environment only occurs when there is a source resource but a corresponding target was not found. This implies that the synchronization system will create the source resource in the target environment. A state of a resource from the target environment only occurs when there is a target resource but a corresponding source was not found. This implies that the synchronization system will delete the target resource from the target environment.

Today, products that synchronize heterogeneous environments, such as MICROSOFT™ Identity Integration Server (MIIS), can only map relationships between objects using primitive attributes, and thus assume that the entire directory exists in a connected environment. Using the synchronization system described herein, these products can express a more complex join criteria based on object semantics and allow parts of identity data to live and reference each other in different connected environments. With cloud computing, federation, and competitive pressures it is becoming increasingly requested for scale to enable synchronizing identities which are only partially stored in one connected environment. For example, it may be onerous for an administrator to reproduce and work with an entire production set of data, which might include thousands of employees and other objects, in a pilot environment. Instead, the administrator may want to work with a handful of representative objects to create policies, and then synchronize those policies to the production environment.

Today, the configuration migration cmdlet matches identity configuration data in two instances of FIM to synchronize configuration. Since the same configuration among different instances can have different identifiers, the synchronization system improves synchronization by matching identity configuration based on object position in the identity graph. This allows customers to migrate changes to existing identity configuration rather than deleting and re-creating unnecessarily. The extra deletions and creations of configuration break audit trails and may violate compliance rules and regulations.

Today, identity-aware applications apply policy by matching an identity's username or SecurityIdentifier (both are simple attribute values). With the pressure of "consumerizing IT," it is becoming popular to create policy rules based on relationships (e.g., person's manager can approve this request). The synchronization system enables identity-aware applications to match an identity to policy simply by locating it inside the identity graph without having to evaluate primitive identity data.

After joining resources, the synchronization system creates a processing graph using joined resources that have a source (every joined resource that will result in creates or modifies). The system uses the source portion of the joined resource (vertex) to build this graph. References from source resources are used to create edges connecting to other joined resources. For example, "User A has the manager User B" would create an edge that points from User A to User B.

Next, the system topologically sorts the graph by traversing the constructed graph using post-order traversal. After visiting a vertex, the system computes the resource level differences between the joined source and target resources. The system outputs the changes to a change list. This list is the ordered list of transitions used for reconciling the target environment with the source environment. For resources that exist only in the source, the information added to the change list creates the resource in the target. For resources that exist in both the source and target, the information added to the change list updates the target based on the computed differences.

Finally, for joined resources that have target resources but no source, the system adds deletion of the target resource to the change list. Unlike existing systems, the synchronization system processes resources by using a topological sort on the merged graph to produce an ordered change list. Previous solutions do not have this graph, and the operation order was dependent on object type or other criteria that result in retries and other failures. These solutions may attempt to update resources that reference resources that have not been created yet. A second retry pass was used to complete the synchronization process, which could lead to inefficiencies and errors. In contrast, the synchronization system makes efficient and steady process through the change list, potentially processing non-dependent changes in parallel, in an order that does not result in the prior dependency problems. Thus, the synchronization system provides a fast, reliable update mechanism for synchronizing two related data environments.

FIG. 1 is a block diagram that illustrates components of the synchronization system, in one embodiment. The system 100 includes an environment export component 110, a direct match component 120, an inferred match component 125, a graph creation component 130, a graph sort component 140, a change list creation component 150, and a change import component 160. Each of these components is described in further detail herein.

The environment export component 110 exports information about the resources in an environment in a manner that allows comparing environments. For example, the component 110 can export a pilot or production environment to a storage format, such as an extensible markup language (XML) file or database. The exported information describes the resources, such as people, groups, or workflows, that are present in each environment as well as values associated with each resource (e.g., name, contact information, and so on). The environment export component 110 may include a command line or other user interface through which an administrator can invoke the component 110 and provide an identification of an environment to export (e.g., through Uniform Resource Locator (URL) or other identifier).

The direct match component 120 joins exported information about two or more environments to produce a joined set of resources by using one or more matching properties in each exported environment. The joined set of resources identifies resources that are only in a first environment, only in a second environment, or present in multiple environments. For more than two environments, the system 100 may provide an indication of each environment in which each resource is present. Joining may attempt to identify resources in each environment that match or are related. It is common to import a snapshot of production data into a pilot environment for testing. After changes are made in the pilot environment, the changes are imported back into the production environment. During this process, the component 120 identifies resources that are the same in both environments, such as by display name or other identifiers that match between the environments.

The inferred match component 125 identifies additional resource matches by inferring relationships based on directly matching resources. For example, if two resources directly match and are each referenced by a parent resource, the parent resource in the source and target environments may be inferred to match, even though they may not share any common properties. This allows policies to be applied to similar, but different, nodes that would otherwise involve more manual and time-intensive treatment for synchronization.

The graph creation component 130 creates a dependency graph that includes directed edges that identify dependence of one resource on another. For example, if a resource that represents a manager is dependent on one or more resources that represent employees, the manager node in the graph may have a directed edge to each employee. The directed edges are used to sort the graph for traversal based on dependency order. The graph provides the processing order that allows the system 100 to more efficiently process merges between environments without unnecessary retries or other failures.

The graph sort component 140 sorts the created dependency graph to produce an order of traversal that allows a resource to be processed before other resources that depend on the resource. For example, if a mailing list resource depends on the existence of one or more users that are members of the mailing list, the sort produces an order of resource creation in the target environment that will create the members before creating the mailing list. In this way, each resource has the items it needs in existence by the time it is created, so there are no unresolved dependencies. The graph sort component 140 can also enforce other relationships and orders relevant to particular problem domains by introducing the other relationships and orders as implied edges in the dependency graph. Any edge in the dependency graph will be considered during the sort so that that resulting graph is ordered in accordance with the dependencies that the edges indicate.

The change list creation component 150 creates a change list based on the ordered dependency graph that provides instructions for modifying a target environment to match a source environment. The change list may contain actions or operations, such as create, delete, and modify operations that specify nodes on which to perform the operations. The operations are based on the joined set of resources and the ordering specified by the dependency graph so that resources that were present only in the source environment are created in the target environment, resources that were present only in the target environment are deleted (though those could be configured to be ignored based on the particular problem domain), and resources that were present in both environments are updated in the target environment to match those in the source environment. The change list created by the component 150 may indicate dependencies among operations so that, for example, parallel threads can process the list and handle non-dependent portions of the list at the same time.

The change import component 160 imports changes from one environment to another by traversing the created change list and performing each operation specified by the change list. For example, the component 160 creates those resources in the target environment that existed only in the source environment, deletes those resources in the target environment not present in the source environment, and updates those resources present in both the source and target environments. The change import component 160 may include a command line or other interface through which an administrator can invoke the component to propagate identified changes into an identified target environment.

The computing device on which the synchronization system is implemented may include a central processing unit, memory, input devices (e.g., keyboard and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, set top boxes, systems on a chip (SOCs), and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
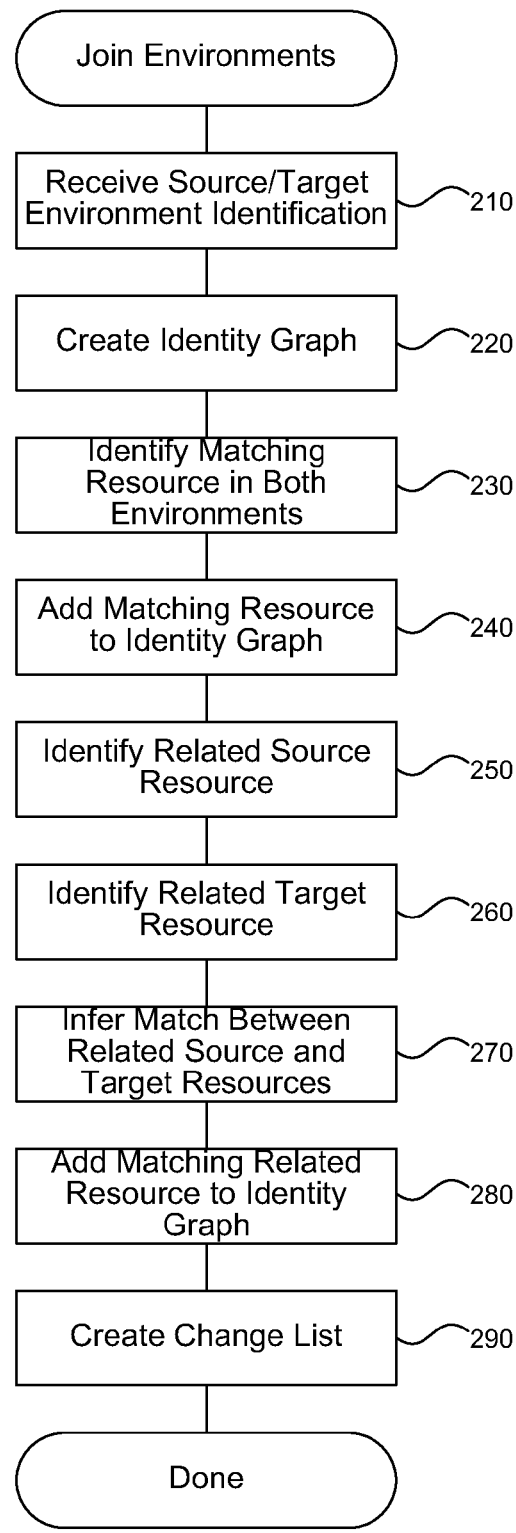
FIG. 2 is a flow diagram that illustrates processing of the synchronization system to join resources in two environments, in one embodiment.

FIG. 2 is a flow diagram that illustrates processing of the synchronization system to join resources in two environments, in one embodiment. Beginning in block 210, the system receives an identification of one or more environments from which to export a description of resources. For example, an administrator may run a utility and specify an address or other identifier of an environment to have the utility export information about the environment to a file or other storage facility.

Continuing in block 220, the system creates an identity graph for processing resource changes. The graph indicates dependencies between resources using directed edges. For example, the system may create a tree that includes leaf nodes that have no dependencies and nodes at higher levels that have one or more dependencies. The system may also topologically sorts the created graph so that the graph contains an order of nodes that allows each node to be processed before any nodes that depend upon it. For example, nodes that represent groups often cannot be processed before the group member nodes have been processed. Thus, the group node may include a directed edge to each group member node and the topological sort may place the group member nodes earlier for traversal than the group node.

Continuing in block 230, the system joins descriptions of resources from multiple environments to identify matching resources in both environments based on direct property matches. The joined set of resources may identify resources that are available in only one of the multiple environments and resources that are available in more than one of the multiple environments. For resources available in both environments, the system identifies resources that have matching properties, such as a display name or other identifier. Continuing in block 240, the system adds matching resources identified by the join to the identity graph. The identity graph is a data structure that holds all of the resources from both environments and indicates how the resources will be merged to synchronize the two environments. Resources that match directly based on a property can be updated to make the target environment match the source environment.

Continuing in block 250, the system identifies one or more target resources that are related to a target resource directly matched with a source resource. For example, the directly matched target resource may have a parent, child, or other related node indicated by an edge in the identity graph. The system looks for related nodes to determine whether a match can be inferred between additional nodes that did not directly match. Continuing in block 260, the system identifies one or more source resources that are related to a source resource directly matched with a target resource.

Continuing in block 270, the system infers a match between the related source resource and the related target resource based on their relationship to the directly matching source and target resources. In this way, the system finds additional matching resources and allows identity-based policies to be more uniformly applied throughout an environment's data set. For example, for a user that has a manager, the administrator may want to apply the same set of policies to the user and manager each time a match to the user is found. The system can infer the match between objects representing the manager after matching the user. Continuing in block 280, the system adds the matching related resources to the identity graph. Adding the related resources to the identity graph allows them to be processed during import of the other resources from the source to the target environment.

Continuing in block 290, the system creates a change list for holding one or more change operations that will conform a target environment to a source environment, wherein the change operations are based on an ordered traversal of the identity graph. For example, the change list may include creations, edits, and deletions for matching a target environment to a source environment. In some ways, the change list can be thought of as a flattening or a traversal log of the sorted graph.

In some embodiments, the change list may be derived from a depth-first or other search of the identity graph. By sorting the graph, the system allows easy extraction of a change list from the graph that places change operations in a dependency order for efficient processing. The system may determine differences in the resources matched within the identity graph based on properties of the resource in the source environment and the target environment, and add a change operation to the created change list that modifies the selected resource in the target environment to match the selected resource in the source environment. After block 290, these steps conclude.

Figure 3:
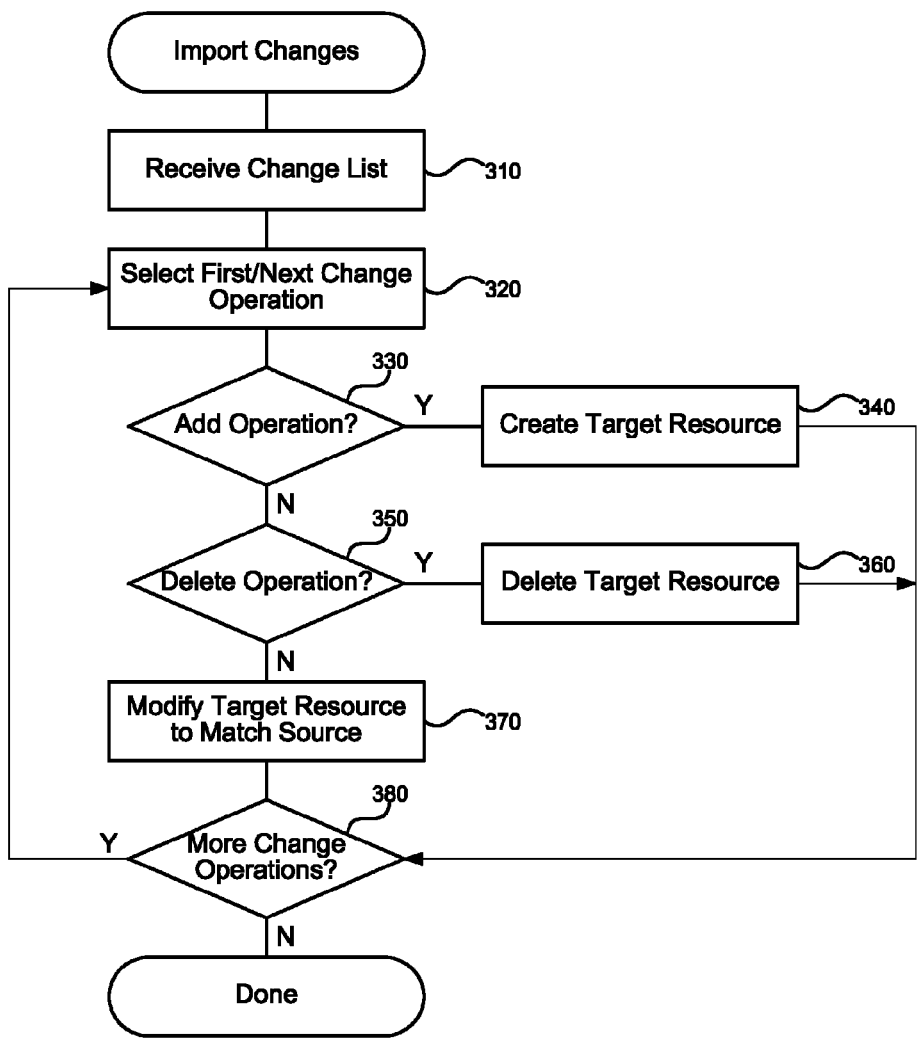
FIG. 3 is a flow diagram that illustrates processing of the synchronization system to process change items from a change list, in one embodiment.

FIG. 3 is a flow diagram that illustrates processing of the synchronization system to process change items from a change list, in one embodiment. Processing the change list imports items from one environment into another environment (e.g., a pilot environment to a production environment). Beginning in block 310, the system receives a change list that specifies one or more change operations for conforming a target environment to a source environment. In some embodiments, the change list is ordered in a manner such that each operation occurs before any other operation that depends upon it. The change list is produced by an export and comparison process, such as that described with reference to FIG. 2. The change list includes matching items between the source and target environments that will be updated in the target environment to reflect differences with the source environment.

Continuing in block 320, the system selects a first change operation from the received change list. During subsequent iterations, the system selects the next change operation from the list. Continuing in decision block 330, if the change operation specifies creation of a new resource in the target environment, then the system continues at block 340, else the system continues at block 350. Continuing in block 340, the system creates the specified resource in the target environment. The system may also set any properties or associated metadata of the new resource based on values extracted from the source environment. After block 340, the system jumps to block 380.

Continuing in decision block 350, if the change operation specifies deletion of a resource from the target environment, then the system continues at block 360, else the system continues at block 380. Continuing in block 360, the system deletes the specified resource in the target environment. In some embodiments, the system may leave the specified resource (e.g., a non-destructive merge) or flag the resource as unused or for later deletion. After block 360, the system jumps to block 380.

Continuing in block 370, the system modifies a resource in the target environment based on a matching resource in the source environment, wherein at least one match was previously determined by inferring a match based on a relationship to a resource in the source environment having a matching property with a resource in the target environment. The system may update properties or other metadata of the matching resource in the target environment to match values specified in the source version of the resource. As described further herein, the system matches some resources in the source and target environments based on direct property value similarities and other resources by inferring a match based on their relationship to directly matching resources (e.g., same parent, same child, and so on).

Continuing in decision block 380, if there are more change operations in the change list, then the system loops to block 320 to select the next change operation, else the system completes. After the system has processed the entire change list, the target environment is up to date with the changes of the source environment. After block 380, these steps conclude.

Figure 4:
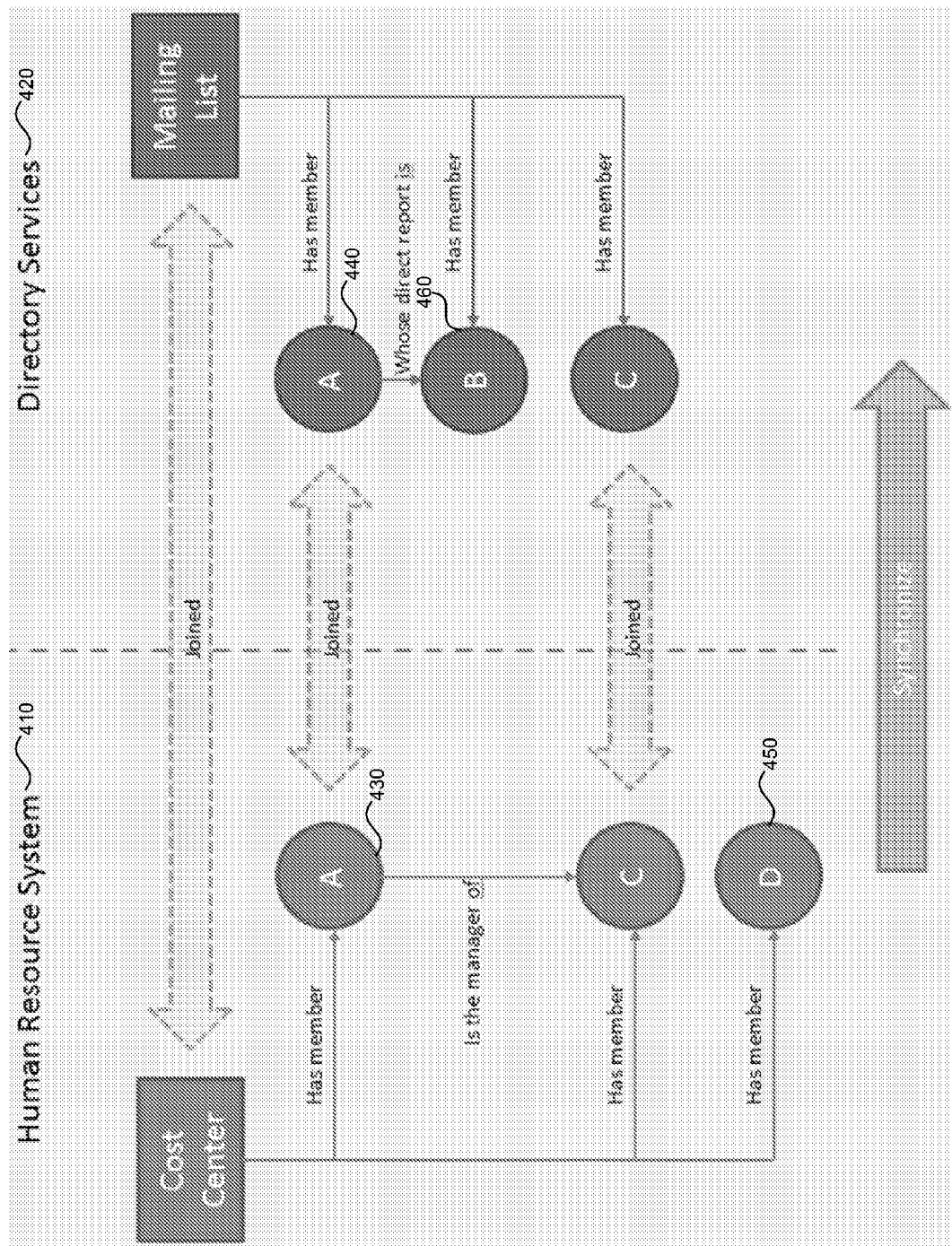
FIG. 4 is a block diagram that illustrates sample source and target environments that are to be merged together, in one embodiment.

FIG. 4 is a block diagram that illustrates sample source and target environments that are to be merged together, in one embodiment. The source environment 410 includes nodes 430 that represent business information for a particular organization. The target environment 420 includes similar nodes 440 and hierarchical organization. Some nodes exist in both environments, such as source node 430 and target node 440. Some nodes exist only in the source environment 410, such as node 450. Some nodes exist only in the target environment 420, such as node 460. An administrator wants to merge the information from the source environment 410 into the target environment, as illustrated further with reference to FIG. 5.

Figure 5:
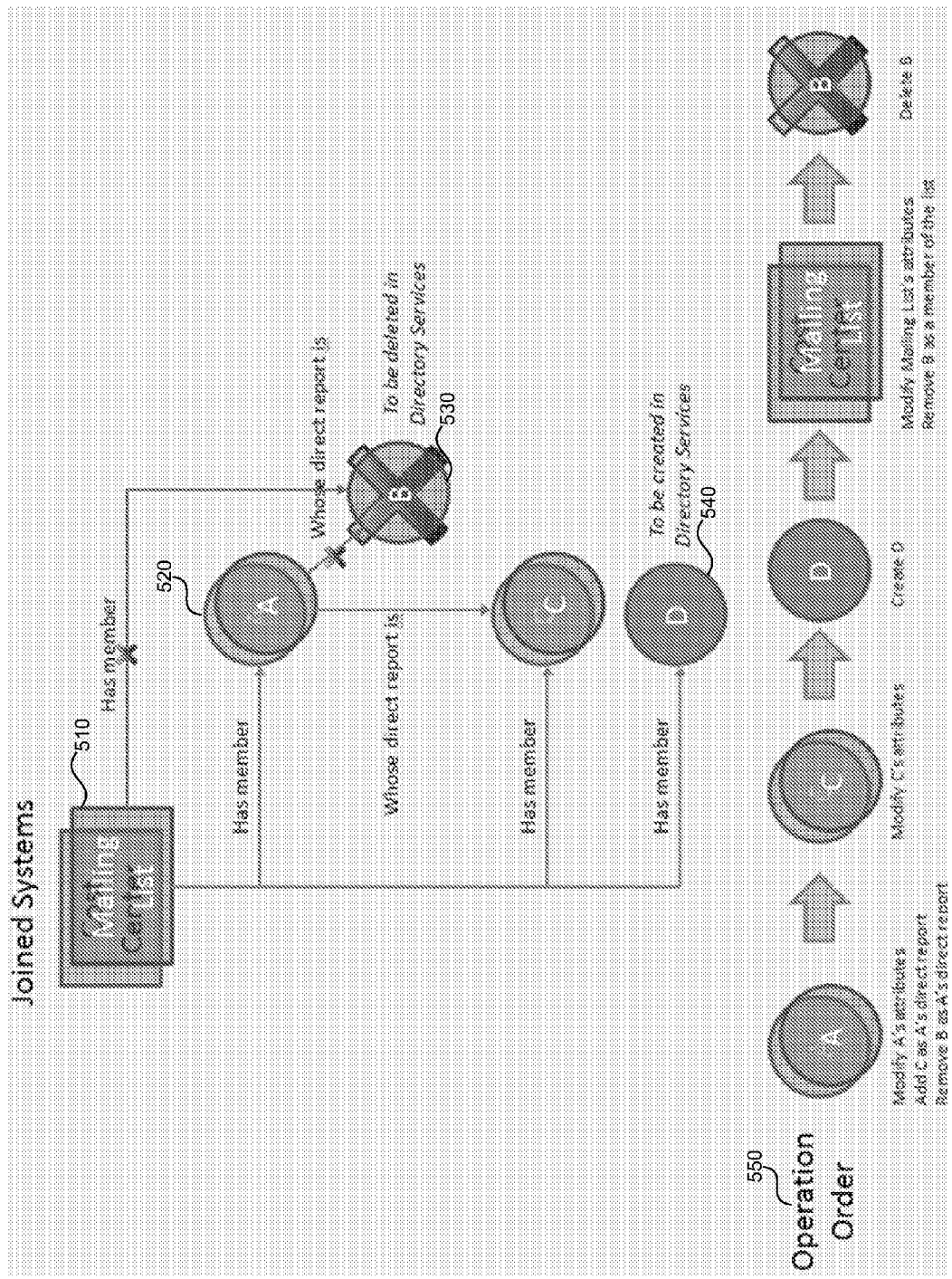
FIG. 5 is a block diagram that illustrates the merging of the sample source and target environments and the resulting change list for accomplishing the merge, in one embodiment.

FIG. 5 is a block diagram that illustrates the merging of the sample source and target environments and the resulting change list for accomplishing the merge, in one embodiment. The figure shows the environments of FIG. 4 overlapped 510 to represent merging the two environments. The joined systems include some nodes 520 that were present in both environments and whose properties will be merged, some nodes 530 present only in the target environment that will be deleted, and some nodes 540 present only in the source environment that will be created in the target environment. The system creates a change list 550 ordered based on resource dependencies so that conflicts are avoided.

As an example, suppose the synchronization system receives the following objects and their types. In a Group Management environment, there exist the following objects with properties: 1) Person A (Reference ID=refA) with display name "Melissa Meyers," and 2) Person B (Reference ID=refB) with display name "Yoichiro Okada" and a "Manager" attribute of refA (referring to Melissa Meyers),In a human resources environment, there exist the following objects with properties: 1) Person C (Reference ID=refC) with display name "Melissa Meyers," 2) Person D (Reference ID=refD) with display name "Yoichiro Okada" and no manager set (e.g., "Manager" is null), and 3) Person E (Reference ID=refD) with display name "Yoichiro Okada" and a "Manager" attribute of refC (referring to Melissa Meyers.

Note that in the human resources environment, there are two people named "Yoichiro Okada" and let us assume that they are different people. The synchronization system's policy is to push attribute changes from the first environment to matching objects in the second environment. For Person and Personnel objects in the two environments, an administrator wants to join by the primitive value attribute "Display Name." Person A joins to Person C by a display name match. Person B has an ambiguous join with Person D or Person E. However, because of the identity graph, the system can identify that Person B has the same identity as Person E since both have the same manager. Thus, Person E inherits join anchors from Person C, and the synchronization system correctly matches Person B with Person E for the synchronization. Once the system has matched Person D and Person E and completed the identity graph, the system can apply policy to synchronize any changes.

In some embodiments, the synchronization system adds implied edges to the dependency graph to respect other ordering preferences. As an additional result of generating the dependency graph, the system can impose additional restrictions in change list ordering. In addition to drawing edges based on references, the can draw additional edges for other conditions that are application-specific. For example, if a particular administrator wants to ensure that the system updates a manager's assistant before the manager's direct reports during synchronization, the system can create this order through an implied edge in the dependency graph. The system draws a directed edge from all of the manager's direct reports to the manager's assistant, and the topological sort will enforce updates on the assistant before the direct reports.

In some embodiments, the synchronization system enforces object type processing order. Since the system may start anywhere in the graph for the topological sort, the system can choose to start at certain object types and enforce an ordering based on object types. Certain systems may prefer this capability, for example, populating all users before creating any groups.

In some embodiments, the synchronization system removes cyclic references. During the topological sort, the system may encounter cycles in the graph. Since deterministic ordering of change operations is desirable, the system can resolve cyclical references. When the system encounters a cycle while building the graph, the system identifies the first non-required reference. Then, the system removes that edge from the graph. If the reference is part of a resource's change, then at the end of the change list the system restores that reference in the target system.

In some embodiments, the synchronization simplifies the dependency graph to reduce the likelihood of cycles. As an additional optimization to resolving cycles, the system can simplify the dependency graph and reduce the likelihood of cycles. First, the system preprocesses the graph and identifies all vertices without changes. For all vertices without changes, the system finds all of the incoming edges and outgoing edges. The system maps each incoming edge to each outgoing edge. If the incoming edge comes from the same resource as the outgoing edge, the system removes the two edges from the graph (this is known as the 2-vertex cycle case).

In some embodiments, the synchronization system modifies the graph to reverse deletion order. As with constructing a graph for resource creation and updates, the system constructs a graph for resource deletion. For example, an administrator may wish to delete a group with an associated user. The system prefers to delete the group before the user since deleting the user first may violate system constraints. Therefore, the system can order deletions to respect dependencies as well.

In some embodiments, the synchronization system performs sorting and/or change operations in parallel for faster processing. The system can speed up the topological sort of the dependency tree by invoking multiple threads to perform the traversal. Each thread first picks an unvisited vertex and begins post-order traversal. The thread accumulates changes in a queue and marks each vertex travelled with a thread identifier. If a thread encounters a vertex that was visited by another thread (thread 2), then the first thread attempts to traverse to another vertex with the same parent. If that is not possible, the first thread blocks until thread 2 completes. When thread 2 completes, the first thread merges the queue from thread 2 with the current thread's queue and clears out thread 2's queue. Subsequently, the system combines all the thread change queues together. The system can perform parallel processing both during the creation of the list of ordered changes as well as importing the list in parallel by importing objects that have fully resolved references and skipping over ones that depend upon preceding operations ("best effort import").

In some embodiments, the synchronization system provides a command line or other interface for system administrators to invoke the system. For example, through the use of PowerShell, the system can export configuration objects from pilot and production, join objects in the two environments together, calculate the transition to migrate from pilot to production, and lastly import the changes back to production. In some embodiments, the system provides a PowerShell cmdlet for each operation: export, join, compare, and import. The export cmdlet retrieves configuration objects through a web service client. The join cmdlet matches the configuration objects in pilot and production. The compare cmdlet calculates the operations to transition pilot configuration objects to production objects. The import cmdlet propagates the transitions to the production environment.

From the foregoing, it will be appreciated that specific embodiments of the synchronization system have been described herein for purposes of illustration, but that various modifications may be made without deviating from the spirit and scope of the invention. Accordingly, the invention is not limited except as by the appended claims.

We claim:

1. A computer-implemented method to create a change list to synchronize resources in two software environments, the method comprising:
    receiving an identification of a source environment and a target environment from which to export a description of resources;
    creating an identity graph for processing resource changes based on a joined set of resources;

sorting the created identity graph to produce an order of traversal that allows a resource to be processed before other resources that depend on the resource;

joining descriptions of resources from multiple environments to identify matching resources in both environments based on direct property matches;

adding matching resources identified by the join to the identity graph;

identifying one or more target resources that are related to a target resource directly matched with a source resource;

identifying one or more source resources that are related to a source resource directly matched with a target resource;

inferring a match between the related source resource and the related target resource based on their relationship to the directly matching source and target resources;

adding the matching related resources to the identity graph; and creating a change list for holding one or more change operations that will conform the target environment to the source environment, wherein the change operations are based on an ordered traversal of the identity graph, wherein the preceding steps are performed by at least one processor.

2. The method of claim 1 wherein creating the graph comprises representing each resource with a node and each dependency between resources with an edge.

3. The method of claim 1 wherein joining descriptions of resources comprises identifying resources available in both environments that have at least one matching property value.

4. The method of claim 1 wherein adding matching resources comprises adding resources that match directly based on a matching property and including information for updating the target environment to match the source environment based on any unmatching properties.

5. The method of claim 1 wherein identifying one or more target resources comprises identifying a parent resource of the directly matched target resource.

6. The method of claim 1 wherein identifying one or more target resources comprises identifying a child resource of the directly matched target resource.

7. The method of claim 1 wherein identifying one or more target resources comprises searching for related nodes to determine whether a match can be inferred between additional nodes that did not directly match.

8. The method of claim 1 wherein inferring the match comprises finding additional matching resources that allow identity-based policies to be uniformly applied throughout an environment's data set.

9. The method of claim 1 wherein adding the matching related resources allows the related resources to be processed during import of resources from the source to the target environment.

10. The method of claim 1 wherein creating the change list comprises creating a list with creations, edits, and deletions for matching a target environment to a source environment.

11. The method of claim 1 wherein creating the change list comprises traversing the sorted graph to place change operations in a dependency order for processing.

12. A computer system for merging objects in different environments of a large-scale software application, the system comprising:

a processor and memory configured to execute software instructions;

an environment export component configured to export information describing the resources in an environment in a manner that allows comparing environments;

a direct match component configured to join exported information about two or more environments to produce a joined set of resources by using one or more matching properties in each exported environment;

an inferred match component configured to identify additional resource matches by inferring relationships based on directly matching resources;

a graph creation component configured to create a dependency graph that includes directed edges that identify dependence of one resource on another;

a graph sort component configured to sort the created dependency graph to produce an order of traversal that allows a resource to be processed before other resources that depend on the resource;

a change list creation component configured to create a change list based on the ordered dependency graph that provides instructions for modifying a target environment to match a source environment; and a change import component configured to import changes from one environment to another by traversing the created change list and performing each operation specified by the change list.

13. The system of claim 12 wherein the environment export component is further configured to export environment information to a storage format, wherein the information describes resources that are present in the environment as well as values associated with each resource.

14. The system of claim 12 wherein the environment export component is further configured to provide a command line interface through which an administrator can invoke the component and provide an identification of an environment to export.

15. The system of claim 12 wherein the direct match component is further configured to identify resources in each environment that are related to matching resources.

16. The system of claim 12 wherein the inferred match component is further configured to identify two resources that directly match and are each referenced by a parent resource, and to infer the parent resource in the source and target environments to match.

17. The system of claim 12 wherein the change list creation component is further configured to create a change list that contains create, delete, and modify operations that specify nodes on which to perform the operations, wherein the operations are based on the joined set of resources and the ordering specified by the dependency graph so that resources that were present only in the source environment are created in the target environment, resources that were present only in the target environment are deleted, and resources that were present in both environments are updated in the target environment to match those in the source environment.

18. The system of claim 12 wherein the change import component is further configured to create those resources in the target environment that existed only in the source environment, delete those resources in the target environment not present in the source environment, and update those resources present in both the source and target environments.

19. A computer-readable storage device comprising instructions for controlling a computer system to process a change list to import resource items from one computer-based environment to another computer-based environment, wherein the instructions, upon execution, cause a processor to perform actions comprising:

receiving a change list that specifies one or more change operations for conforming a target environment to a source environment, wherein the change list is ordered in a manner such each operation occurs before any other operation that depends upon it, and wherein the change list is sorted according to a dependency graph that includes directed edges that identify dependence of one resource on another resource, to produce an order of traversal that allows a resource to be processed before other resources that depend on that resource, and wherein the dependency graph indicates dependencies between resources using directed edges that identify dependence of one resource on another resource and wherein descriptions of resources from multiple environments are joined to create a joined set of resources that identify resources in each of the multiple environments that match based on direct property matches;

selecting a first change operation from the received change list;

when the change operation specifies creation of a new resource in the target environment, creating the specified resource in the target environment;

when the change operation specifies deletion of a resource from the target environment, deleting the specified resource in the target environment;

when the change operation specifies updating a resource that exists in both the source and target environments, modifying a resource in the target environment based on a matching resource in the source environment, wherein at least one match was previously determined by inferring a match based on a relationship to a resource in the source environment having a matching property with a resource in the target environment; and performing each subsequent change operation in the received change list so that the target environment is up to date with the changes of the source environment.

* * * * *